2,955,380

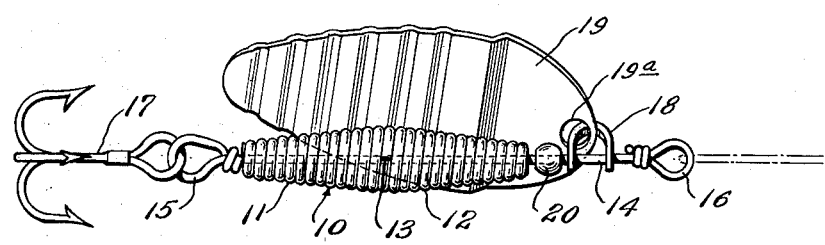
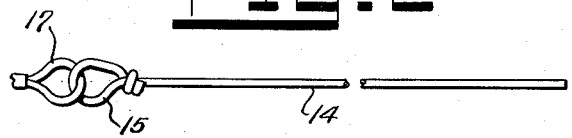
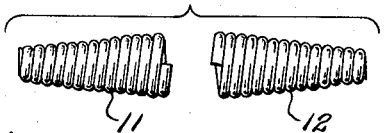
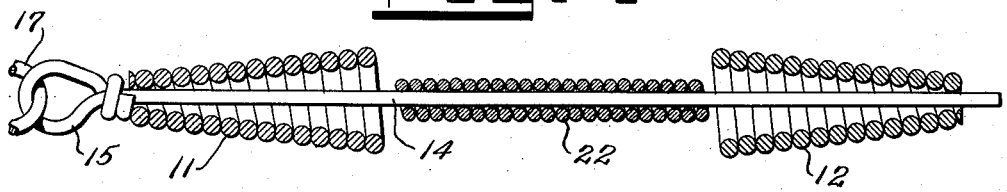
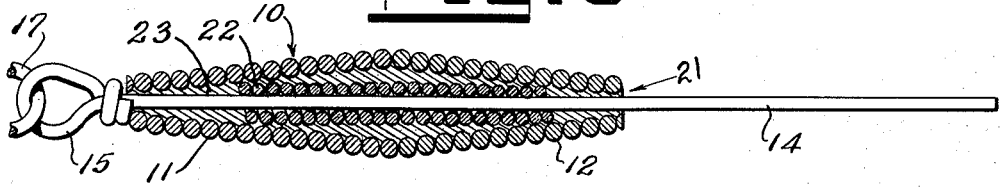
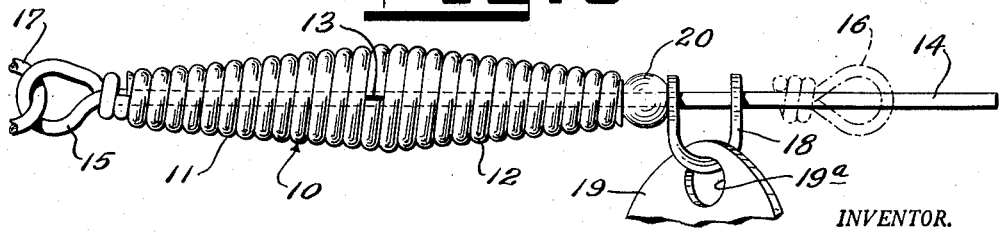
INVENTOR.
MICHAEL J. HULICK
BY
ATTORNEY

# United States Patent Office 2,955,380
Patented Oct. 11, 1960

LOADED FISH LURE

Michael J. Hulick, 114 Garden Circle, Waterbury, Conn.

Filed July 14, 1959, Ser. No. 826,999

1 Claim. (Cl. 43—42.36)

This invention relates to fishing tackle, and more particularly to a loaded fish lure which may be made of any desired weight according to the wishes or needs of the fisherman.

One object of the present invention is to provide a device of the above nature which will be simple in construction, inexpensive to manufacture, easy to install and manipulate, compact, ornamental in appearance, and very efficient and durable in use.

With these and other objects in view, there has been illustrated on the accompanying drawing one form in which the invention may conveniently be embodied in practice.

In the drawing,

Fig. 1 represents a side assembly view of the improved fish lure as it appears when combined with a hook, a spinner blade, an anti-friction ball, and a fish line.

Fig. 2 is a fragmentary view showing a portion of the interior rod which is connected to the hook.

Fig. 3 is a side view, in separated relation, of the two opposed halves of the fish lure before they have been bonded together by means of a gas flame.

Fig. 4 is a sectional view, on an enlarged scale, of the lure coils in separated relation and showing the central rod, and the initial small coil of solder surrounding said rod.

Fig. 5 is a sectional view showing the central rod connected to the hook, the initial solder wire, and the surrounding fused mass of solder located within the exterior coils of the lure.

Fig. 6 is a side view of the same showing a portion of the hook, the spinner, the fish line, the clevis, and the friction-reducing ball.

Referring now to the drawing in which like reference numerals denote corresponding parts throughout the several views, the numeral 10 indicates an elliptical shell composed of two opposed initially separated outwardly converging half sections 11 and 12 of coiled wires, which are connected by means of solder and having a central slot 13 as clearly shown in Fig. 1 where the ends of the coiled wires terminate in abutment. The numeral 14 indicates an interior rod having loop eyes 15 and 16 at the ends thereof. The loop eye 16 is adapted to receive a three pronged hook 17 (Fig. 1) at one end, and the rod 14 passes through a friction-reducing bead 20 and a U-shaped clevis 18, by which it is connected to an oval shaped spinner blade 19 of ribbed construction, having a hole 19a for attachment to said clevis 18. The numeral 22 indicates an initial filler coil of fusible lead solder wire, and the numeral 21 indicates a hole at the right hand end of the half coil 12 through which melted solder may be inserted into the interior of the lure to form a solid fused mass 23 surrounding the interior coil 22 and the rod 14 as clearly illustrated in Fig. 5.

One advantage of the present invention, due to the streamlined elliptical shape of the lure, is that it may be cast for long distances, enabling the fisherman to reach likely spots where the chances of catching a fish are the greatest. The closely wound spiral sections 11 and 12 which form the body of the shell simulate the ribs of minnows, many of which in real life have semi-transparent bodies thereby exposing the interior rib structure to some extent. The elliptical body shell of the lure is preferably made of closely wound rust-free wire which may be of stainless steel, brass, copper or any other suitable material. The wire coils 11, 12 are closely wound to form a tight shell within which is received the interior fused metal of high specific gravity. The rod 14 which is located within the center of the lure may also be made of stainless steel wire. The clevis 18 serves as a free turning connection between the spinner blade 19 and the rod 14, thus allowing said blade to revolve or spin freely around the axis of the body of the lure. The purpose of the bead 20 is to keep friction to the minimum and allow the clevis 18 to spin around the body 14 as freely as possible. The solder wire which is confined within the body lure may be made of lead, or any other heavy metal having a low melting point.

While there has been disclosed in this specification one form in which the invention may be embodied it is to be understood that this form is shown for the purpose of illustration only, and that the invention is not limited to the specific disclosure but may be modified and embodied in various other equivalent forms without departing from its spirit. In short, the invention includes all the modifications and embodiments coming within the scope of the following claim.

Having thus fully described the invention, what is claimed as new and for which it is desired to secure Letters Patent is:

In a fish lure, a pair of opposed conical half shells secured together at their larger inner ends and converging toward their outer ends, an interior rod passing through the entire length of said lure, and a mass of fused solder located within said half shells for bonding them together, said solder comprising an inner coil of solder wire closely embracing said rod, and a surrounding mass of fused solder bonded to said solder wire and to the inside of said half shells.

References Cited in the file of this patent

UNITED STATES PATENTS

| | | |
|---|---|---|
| 1,989,850 | Dorsey | Feb. 5, 1935 |
| 2,437,549 | Pecher | Mar. 9, 1948 |
| 2,597,982 | Fitzgerald | May 27, 1952 |
| 2,781,603 | Ganger | Feb. 19, 1957 |